United States Patent [19]
Coran et al.

[11] 4,320,173
[45] Mar. 16, 1982

[54] RUBBER COMPOSITIONS CONTAINING N-(CARBOXYALKYL)MALEAMIC ACID

[75] Inventors: Aubert Y. Coran; Raman Patel, both of Akron, Ohio

[73] Assignee: Monsanto Company, St. Louis, Mo.

[21] Appl. No.: 151,237

[22] Filed: May 19, 1980

[51] Int. Cl.³ .................. B32B 15/06; C08K 3/08; C08L 7/00; C08L 9/00
[52] U.S. Cl. ........................... 428/457; 428/462; 428/465; 428/492; 428/521; 525/293; 525/296; 524/439; 524/440; 524/441; 260/726; 260/756
[58] Field of Search ............... 525/293, 296; 428/457, 428/462, 465; 260/42.32, 42.33, 756

[56] References Cited
U.S. PATENT DOCUMENTS 2,989,504  6/1961  Little ...................................... 260/62
3,502,542  3/1970  Wenisch .............................. 161/216

FOREIGN PATENT DOCUMENTS 880596 10/1961 United Kingdom .

OTHER PUBLICATIONS

"Vulcanization with Maleimides"–Tawney et al., J. of App. Poly. Sci., vol. 8, pp. 2281-2298 (1964).

Primary Examiner—Carman J. Seccuro
Attorney, Agent, or Firm—Larry R. Swaney

[57] ABSTRACT

Rubber compositions and reinforced rubber articles are described which exhibit improved adhesion by the incorporation therein of an adhesive amount of certain N-(carboxyalkyl)maleamic acids.

22 Claims, No Drawings

RUBBER COMPOSITIONS CONTAINING N-(CARBOXYALKYL)MALEAMIC ACID

This invention relates to rubber compositions containing N-(carboxyalkyl)maleamic acid which compositions exhibit improved adhesion, and, to reinforced rubber articles comprising vulcanized rubber bonded to a reinforcing member.

BACKGROUND OF THE INVENTION

Good adhesion between vulcanized rubber and reinforcing members (either in the form of continuous filaments, fibers, or sheets) is required to manufacture rubber articles, such as, tires, hoses, moldings, and others. It is especially difficult to adhere reinforcing members to saturated rubber cured with free radical vulcanizing agents. U.S. Pat. No. 3,502,542, issued Mar. 24, 1970, describes the use of N-(carboxyphenyl)maleamic acid as a rubber additive to increase the adhesion of rubber to metals. However, rubber articles often fail by loss of adhesion between the rubber and the reinforcing member. Thus, better adhesion is needed to extend the useful life of rubber articles.

SUMMARY OF THE INVENTION

It has now been found that incorporation of N-(carboxyalkyl)- or N-(dicarboxyalkyl)maleamic acid into vulcanizable rubber gives compositions exhibiting excellent adhesion. Vulcanization of an assembly of vulcanizable rubber compositions of the invention and reinforcing members (e.g., in the form of continuous filaments, fibers, or sheets, etc.) gives a reinforced rubber article with superior bonding between the vulcanized rubber and reinforcing member.

Vulcanizable rubber composition of the invention comprises vulcanizable rubber, vulcanization system, and an adhesive amount of a compound of the formula

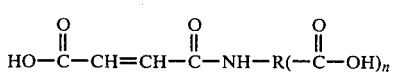

in which n is one or two, and R is a straight or branched divalent or trivalent saturated aliphatic radical of 1–6 carbon atoms. Generally, amounts of about 0.2 to 20 parts by weight of the formula compound per 100 parts by weight of rubber give satisfactory adhesion, with amounts of about 0.5 to ten parts by weight being preferred. The use of about 1 to 6 parts of the N-(carboxyalkyl)maleamic acid per 100 parts of rubber is more preferred. The nature and size of the radical R are important. For example, compounds in which R is alkylene are better adhesives than corresponding compounds in which R is phenylene. Also, adhesion decreases when the number of carbon atoms exceeds six. Preferably, R is alkylene of 1–5 carbon atoms.

The substituted almeamic acids useful for preparing vulcanizable rubber compositions of the invention may be named as derivatives of 4-oxo-2-butenoic acid, i.e., 4-(carboxyalkylamino)-4-oxo-2-butenoic acid. However, for convenience, they shall be named herein as derivatives of maleamic acid. Examples of substituted maleamic acids suitable for the practice of this invention are:

N-(carboxymethyl)maleamic acid
N-(1-carboxyethyl)maleamic acid
N-(2-carboxyethyl)maleamic acid
N-(1-carboxypropyl)maleamic acid
N-(2-carboxypropyl)maleamic acid
N-(3-carboxypropyl)maleamic acid
N-(1-carboxybutyl)maleamic acid
N-(2-carboxybutyl)maleamic acid
N-(3-carboxybutyl)maleamic acid
N-(4-carboxybutyl)maleamic acid
N-(5-carboxypentyl)maleamic acid
N-(6-carboxyhexyl)maleamic acid
N-(1,2-dicarboxyethyl)maleamic acid
N-(1,3-dicarboxypropyl)maleamic acid
N-(1,2-dicarboxypropyl)maleamic acid
N-(1,4-dicarboxybutyl)maleamic acid
N-(1,5-dicarboxypentyl)maleamic acid
N-(1,6-dicarboxyhexyl)maleamic acid
N-(2,2-di[carboxymethyl]propyl)maleamic acid One embodiment of the invention comprises reinforced articles comprising metal reinforcement (e.g., in the form of filaments, discontinuous fibers, or sheets, etc.) and vulcanized rubber bonded thereto. Improved adhesion between the metal and rubber is achieved by incorporation of N-(carboxy-$C_1$-$C_6$-alkyl)maleamic or N-(dicarboxy-$C_1$-$C_6$-alkyl)maleamic acid into a vulcanizable rubber composition. A composite structure is then formed by contacting the said vulcanizable rubber composition with metal reinforcing member; preferably sufficient pressure is applied to assure the vulcanizable rubber composition completely covers the metal surface, and vulcanizing the structure. A bond between the rubber and metal forms during vulcanization.

Any amount of N-(carboxyalkyl)maleamic acid which increases the adhesion between the metal and the vulcanized rubber is satisfactory for making the improved articles of the invention. The amount required varies depending upon the type of metal, type of rubber, and type of vulcanization system used. However, the amount is readily ascertained by trial within the skill of the art. The amount is incrementally increased until sufficient adhesion is achieved. It is understood that reinforced articles of the invention include composites, laminates and structures in which the metal member is in the form of a film, foil, sheet, or continuous or discontinuous fibers.

Vulcanizable rubbers are generally satisfactory for the practice of the invention. Rubbers which are vulcanizable by using vulcanization systems which comprise peroxide- or sulfur-vulcanizing agent are especially suitable. Both saturated and unsaturated rubbers are satisfactory with diene rubbers (such as natural rubber and styrene-butadiene rubber) and EPDM rubber being preferred. For examples of suitable rubbers and vulcanization systems, see *Vulcanization and Vulcanizing Agents*, by W. Hofmann, Palmerton Publishing Co., Inc., New York.

Metal structural members are generally suitable for making articles of the invention; particularly suited are metals exhibiting valence states of two or more and melting temperatures about 200° C. Preferred metal members are selected from the group consisting of iron, aluminum, zinc, copper, and their alloys, such as brass and steel, with aluminum being especially preferred.

DESCRIPTION OF THE PREFERRED EMBODIMENTS

To prepare vulcanizable rubber composition of the invention, a masterbatch is prepared by conventional means, said composition comprising (all parts by weight) 100 parts of EPDM rubber (Epsyn 70A), 90 parts of carbon black (N-550), 50 parts of paraffinic extender oil and 2 parts of magnesium oxide. To 242 parts of the masterbatch there are incorporated by mastication in an internal mixer at about 100° C., 3 parts of peroxide vulcanizing agent (dicumyl peroxide Dicup R) and 4 parts of adhesion promoter. Cured specimens are prepared by press-curing at 165° C. for 30 minutes. Stress-strain properties are shown in Table 1.

To illustrate reinforced articles of the invention, a reinforced article is formed by bonding two 5 mil. thick aluminum sheets (5"×5" square) together with about 1 gram of the vulcanizable compositions prepared as described above. An aluminum sandwich comprising the two aluminum sheets bonded by a vulcanized rubber interlayer is formed by press curing at 165° C. for 30 minutes and at a pressure sufficient to give a rubber interlayer about 5 mils. thick. The sandwich is cut into one inch strips. The peel force required to pull the two aluminum strips apart at 180° is measured with a tensile tester by using a jam separation speed of 10 inches per minute. The adhesion values are recorded in pounds per linear inch, pli. After pulling the sandwich apart, the amount of rubber covering the metal surface is visually estimated using a scale of 0-5. Zero indicates no coverage with all the rubber completely pulling away from the metal surface. A 5 rating means that the rubber completely covers the metal surface and that separation of the sandwich is due to tearing of the cured rubber. The adhesion results are shown in Table 1.

TABLE 1

| STOCK | ADDITIVE | Aluminum Adhesion Peel, pli | Coverage | TS, MPa | $M_{100}$, MPa | Elong., % |
|---|---|---|---|---|---|---|
| 1 | None | 4.5 | 0.0 | 10.3 | 1.34 | 560 |
| 2 | HVA-2 | 24.0 | 5.0 | 13.6 | 3.21 | 260 |
| 3 | N-(4-carboxyphenyl-maleamic acid | 25.5 | 0.5 | 11.4 | 1.34 | 550 |
| 4 | N-(carboxymethyl)-maleamic acid | 38.8 | 5.0 | 14.6 | 1.90 | 490 |
| 5 | N-(3-carboxypropyl)-maleamic acid | 46.4 | 5.0 | 13.0 | 1.72 | 500 |
| 6 | N-(5-carboxypentyl)-maleamic acid | 38.5 | 4.0 | 13.6 | 1.63 | 480 |
| 7 | N-(1,3-dicarboxypropyl)-maleamic acid | 40.0 | 5.0 | 12.9 | 1.45 | 480 |

Stock 1 is a control containing no adhesion promotor. Stock 2 is a control containing m-phenylene bis-maleimide, HVA-2, a commercially available rubber curative and adhesion promotor. Stock 3 is a control containing N-(4-carboxyphenyl)maleamic acid, an adhesion promotor described in U.S. Pat. No. 3,502,542. Stocks 4-7 illustrate the invention; the adhesion promotors are N-(carboxymethyl)maleamic acid, N-(3-carboxypropyl)maleamic acid, N-(5-carboxypentyl)maleamic acid, and N-(1,3-dicarboxypropyl)maleamic acid, respectively. The data show the N-(carboxyalkyl)-maleamic acid compounds give superior adhesion measured either by peel or surface coverage. Stock 1, without adhesion promotor, gives only 4.5 pli peel force and zero coverage, both values indicating no practicable adhesion. Stock 2, containing HVA-2, gives a 24 pli peel value and complete coverage; however, it caused an increase in 100 percent modulus and a descrease in ultimate elongation. Stock 3 containing a known adhesion promotor gives 25.5 pli peel value but only 0.5 coverage. Stocks 4-7 containing adhesion promotors of the invention give superior peel values of 38.5 to 46.4 pli. Surface coverage values are 5.0 except for Stock 6 which is 4.0. Thus, the adhesion promotors of the invention by either test method are superior to the promotors of Stocks 2 and 3.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A vulcanizable rubber composition comprising vulcanizable diene rubber, vulcanization system, and an adhesive amount of a compound of the formula

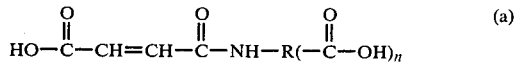

in which n is one or two, and R is a straight or branched divalent or trivalent saturated aliphatic radical of 1-6 carbon atoms.

2. The composition of claim 1, which comprises peroxide or sulfur vulcanizable rubber, a vulcanization system comprising peroxide or sulfur vulcanizing agent, and about 0.2 to 20 parts by weight of a compound of formula (a) per 100 parts by weight of rubber.

3. The composition of claim 2 in which R contains 1-5 carbon atoms.

4. The composition of claim 3 in which n is two.

5. The composition of claim 4 in which the compound is N-(1,3-dicarboxypropyl)maleamic acid.

6. The composition of claim 3 in which n is one.

7. The composition of claim 6 in which the compound is N-(carboxymethyl)maleamic acid.

8. The composition of claim 6 in which the compound is N-(3-carboxypropyl)maleamic acid.

9. The composition of claim 6 in which the compound is N-(5-carboxypentyl)maleamic acid.

10. A reinforced rubber article comprising vulcanized rubber composition of claim 1 and reinforcing member bonded thereto.

11. The article of claim 10 comprising vulcanized rubber of claim 2 and a metal reinforcing member.

12. The article of claim 11, in which the reinforcing member is iron, aluminum, zinc, copper, or alloys thereof.

13. The article of claim 12 in which the vulcanized rubber is selected from the group consisting of natural rubber, styrene-butadiene rubber and EPDM rubber.

14. The article of claim 13 in which the rubber is EPDM rubber.

15. The article of claim 14 in which the reinforcing member is aluminum.

16. The article of claim 15 in which n is two and R is a trivalent radical derived from alkane of 1–5 carbon atoms.

17. The article of claim 16 in which the compound is N-(1,3-dicarboxypropyl)maleamic acid.

18. The article of claim 15 in which n is one.

19. The article of claim 18 in which R is straight chain alkylene of 1–5 carbon atoms.

20. The article of claim 19 in which the compound is N-(3-carboxypropyl)maleamic acid.

21. The article of claim 19 in which the compound is N-(carboxymethyl)maleamic acid.

22. The article of claim 19 in which the compound is N-(5-carboxypentyl)maleamic acid.

* * * * *